Patented July 22, 1941

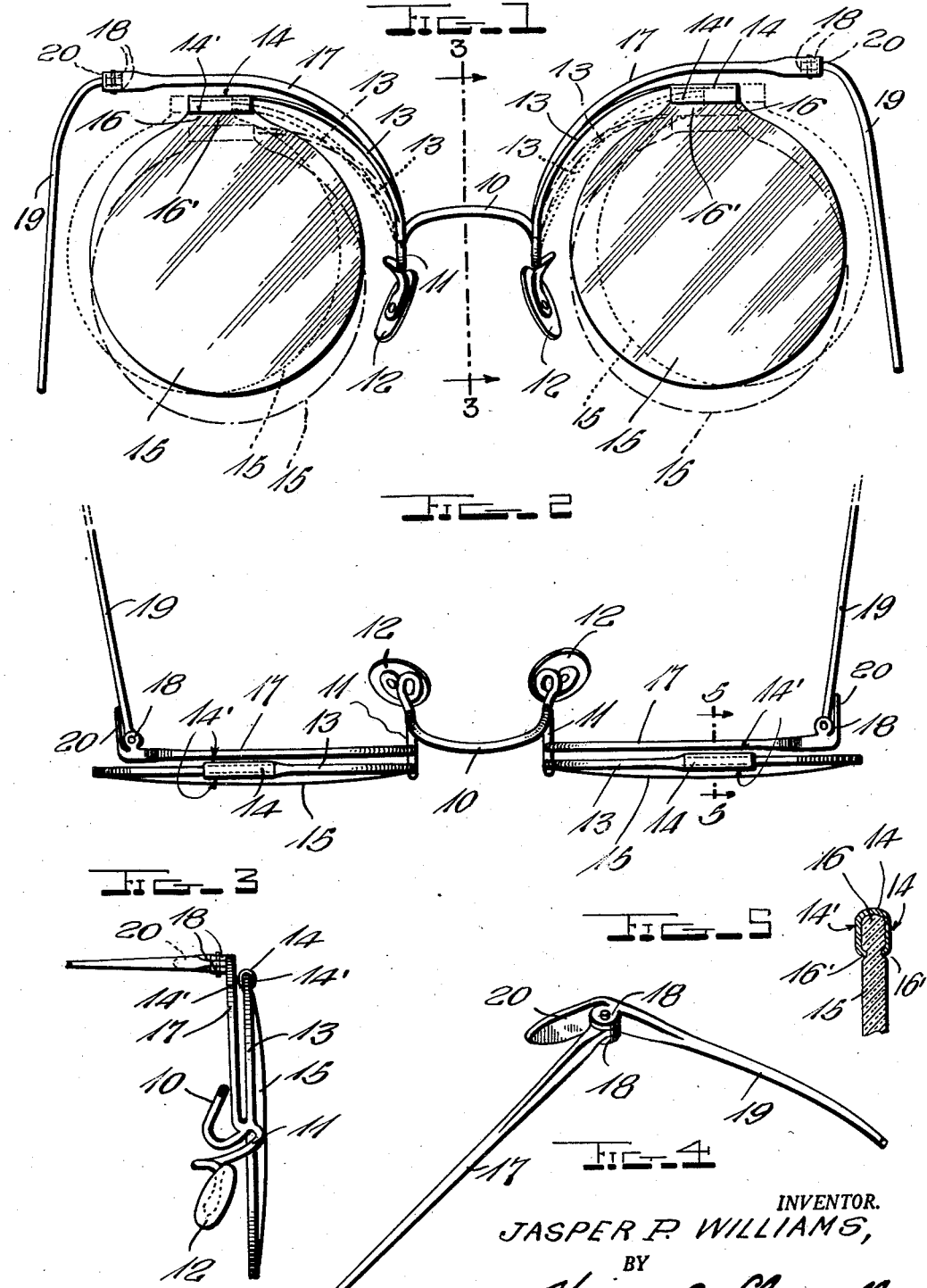

2,250,243

UNITED STATES PATENT OFFICE 2,250,243

SPECTACLES

Jasper P. Williams, Waynesboro, Miss.

Application December 5, 1940, Serial No. 368,726

4 Claims. (Cl. 88—41)

This invention relates to eyeglasses of the rimless spectacle type, the principal object thereof being to provide a structure wherein no portion of the frame will come within the line of vision of the wearer.

Another object is to provide spectacles of the type mentioned wherein the lenses are attached to the nose bridge in such a manner as will permit of their being quickly and accurately adjusted both vertically and horizontally, according to the requirements of the wearer.

A further object is to provide a structure wherein the lenses are supported without the necessity of passing screws therethrough.

Other objects and advantages will be apparent from the following specification when taken in connection with the accompanying drawing, in which Fig. 1 is a front elevation of spectacles made according to the present invention, Fig. 2 is a plan view thereof, Fig. 3 is a sectional view taken on the line 3—3 of Fig. 1, Fig. 4 is a detail view in perspective, illustrating a stop for limiting the outward movement of the bows, and Fig. 5 is a sectional view on the line 5—5 of Fig. 2.

Referring to the drawing, 10 designates the nose bridge which is integrally connected at its ends to upwardly and forwardly supporting loops 11, as clearly illustrated in Fig. 3, and attached to the free ends of the loops 11, in any suitable manner, are the nosepieces 12.

Integrally connected at one end to and extending upwardly and laterally outward from the upper sides of the loops 11 adjacent their forward ends are curved lens supports 13, the outer end portions of which are flattened and bent downwardly at their margins to form lens clips 14 having side members 14' within which clips the lenses 15 are securely held. In order to eliminate any possibility of the clips 14 coming within the line of vision of the wearer, the lenses 15 are shaped to provide upwardly projecting ears 16 at their upper edges, which ears are held in line with the vertical axes of the lenses and are held within the clips 14 in a manner now to be described. As shown in Fig. 5, the ears 16 are provided with transverse grooves 16' at their opposite sides, and the lower edges of the side members 14' of the clips 14 are bent inwardly so as to fall within these grooves and thus clamp and firmly hold the ears 16 therebetween.

Integrally connected to the upper sides of the loops 11 immediately in the rear of the lens supports 13 are curved bow-supports 17 which extend upwardly and outwardly in the same general direction as the lens supports 13, and adjacent the free end of the bow-supports 17 are rearwardly disposed spaced ears 18 between which the forward ends of the bows 19 are pivotally connected. The end portions of the supports 17, beyond the ears 18, are bent rearwardly at substantially right angles to provide stops 20 for limiting the outward movement of the bows. It is to be understood that the entire frame structure excepting the nosepieces 12 will be preferably formed of a somewhat pliable metal so that its various parts may be bent or adjusted according to the requirements of the wearer. The nosepieces 12 may be formed of such material as is customarily used for the purpose.

Because of the use of the supports 13 and 17 for supporting the lenses and bows, which supports are entirely out of the sight of the wearer, there is nothing in the line of vision other than the lenses 15.

Should it be found necessary to adjust the lenses vertically in either direction, or to adjust them toward or away from each other, this may be readily accomplished by bending the lens supports 13 with pliers in a manner that will be readily understood. An example of vertical adjustment of the lenses is shown in dot-and-dash line in Fig. 1, and an example of transverse adjustment thereof is shown in dotted line in the same figure. Because of the particular manner in which the lenses of the present invention are supported, the adjustments mentioned may be carried out without disturbing the relative positions of the axes of the lenses.

In the past, the lenses of rimless spectacles have been attached direct to the nose bridge member by means of screws which pass through perforations in the lenses. This arrangement not only rendered the lenses susceptible to breakage at the perforations, but because of their being directly connected to the nose bridge it has been impossible to adjust them either vertically or horizontally with respect to the latter.

While the invention described herein is believed to be the preferred form of the invention, it will be understood that numerous changes may be made therein without departing from the spirit of the invention or the scope of the subjoined claims.

What is claimed, is:

1. Spectacles including a nose bridge, supporting loops connected to the ends of the nose bridge and extending upwardly and forwardly therefrom, curved lens supports connected to said loops and extending upwardly and laterally outward therefrom, lens clips carried by the outer ends of the lens supports, said clips including side members having inturned edges, a pair of lenses each having an ear extending upwardly from its periphery in line with its vertical axis, said ears having transverse grooves receiving said inturned edges of the lens clips, and bows connected to said nose bridge.

2. Spectacles including a nose bridge, supporting loops connected to the ends of the nose bridge and extending upwardly and forwardly therefrom, curved lens supports connected to said loops and extending upwardly and laterally outward therefrom, lens clips carried by the outer ends of the lens supports, a pair of lenses each having an ear extending upwardly from its periphery in line with its vertical axis, said ears being held within said lens clips, bow supports connected to the supporting loops rearwardly of the lens supports and curving upwardly and laterally beyond said lens clips, and bows pivotally connected to the bow supports.

3. Spectacles including a nose bridge, supporting loops connected to the ends of the nose bridge and extending upwardly and forwardly therefrom, curved lens supports connected to said loops and extending upwardly and laterally outward therefrom, lens clips carried by the outer ends of the lens supports, a pair of lenses each having an ear extending upwardly from its periphery in line with its vertical axis, said ears being held within said lens clips, bow supports connected to the supporting loops rearwardly of the lens supports and curving upwardly and laterally beyond said lens clips, bow stops extending rearwardly from the free ends of the bow supports, and bows pivotally connected to the bow supports inwardly of said stops.

4. Spectacles including a nose bridge, supporting loops connected to the ends of the nose bridge and extending upwardly and forwardly therefrom, curved lens supports connected to said loops and extending upwardly and laterally outward therefrom, lens clips carried by the outer ends of the lens supports, said clips including side members having inturned edges, a pair of lenses each having an ear extending upwardly from its periphery in line with its vertical axis, said ears having transverse grooves receiving said inturned edges of the lens clips, bow supports connected to the supporting loops rearwardly of the lens supports and curving upwardly and laterally beyond said lens clips, and bows pivotally connected to the bow supports.

JASPER P. WILLIAMS